United States Patent
Chung (10) Patent No.: US 11,709,795 B2
(45) Date of Patent: Jul. 25, 2023

(54) ELECTRONIC DEVICE INCLUDING MAIN PROCESSOR AND SYSTOLIC ARRAY PROCESSOR AND OPERATING METHOD OF ELECTRONIC DEVICE

(71) Applicant: Electronics and Telecommunications Research Institute, Daejeon (KR)

(72) Inventor: Jaehoon Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/525,146

(22) Filed: Nov. 12, 2021

(65) Prior Publication Data

US 2022/0147485 A1     May 12, 2022

(30) Foreign Application Priority Data

Nov. 12, 2020 (KR) .................. 10-2020-0151331
Nov. 3, 2021 (KR) .................. 10-2021-0149469

(51) Int. Cl.
    *G06F 15/80*     (2006.01)
    *G06F 1/10*     (2006.01)
    *G06F 9/30*     (2018.01)

(52) U.S. Cl.
    CPC ............ *G06F 15/8046* (2013.01); *G06F 1/10* (2013.01); *G06F 9/3017* (2013.01)

(58) Field of Classification Search
None
See application file for complete search history.

(56) References Cited

U.S. PATENT DOCUMENTS

| | | | |
|---|---|---|---|
| 8,710,864 B2 * | 4/2014 | Dasu ................... | G06F 15/7867 326/38 |
| 9,652,019 B2 | 5/2017 | Dongara et al. | |
| 9,735,778 B1 * | 8/2017 | Schulz .................. | G06F 1/3243 |
| 9,852,790 B1 * | 12/2017 | Gokmen ............ | G11C 13/0069 |
| 2008/0294871 A1 * | 11/2008 | Pappalardo ......... | G06F 15/8023 712/E9.001 |
| 2015/0269295 A1 * | 9/2015 | Selvidge ............. | G06F 30/3312 716/108 |
| 2019/0114548 A1 * | 4/2019 | Wu ................... | H04W 72/1226 |

(Continued)

FOREIGN PATENT DOCUMENTS

KR     10-2017-0015769     2/2017

*Primary Examiner* — Eric Coleman
(74) *Attorney, Agent, or Firm* — Kile Park Reed & Houtteman PLLC (57) ABSTRACT

Disclosed is an electronic device which includes a main processor, and a systolic array processor, and the systolic array processor includes processing elements, a kernel data memory that provides a kernel data set to the processing elements, a data memory that provides an input data set to the processing elements, and a controller that provides commands to the processing elements. The main processor translates source codes associated with the systolic array processor into commands of the systolic array processor, calculates a switching activity value based on the commands, and stores the translated commands and the switching activity value to a machine learning module, which is based on the systolic array processor.

14 Claims, 6 Drawing Sheets

(56) References Cited

U.S. PATENT DOCUMENTS

| | | |
|---|---|---|
| 2019/0179397 A1 | 6/2019 | Lee et al. |
| 2020/0094416 A1 | 3/2020 | Park et al. |
| 2020/0311860 A1* | 10/2020 | Kaburlasos ............... G06T 1/20 |
| 2021/0247797 A1† | 8/2021 | Gu et al. |
| 2021/0382765 A1* | 12/2021 | Venkatesh ............... G06F 9/542 |

\* cited by examiner
† cited by third party

ELECTRONIC DEVICE INCLUDING MAIN PROCESSOR AND SYSTOLIC ARRAY PROCESSOR AND OPERATING METHOD OF ELECTRONIC DEVICE

CROSS-REFERENCE TO RELATED APPLICATIONS

This application claims priority under 35 U.S.C. § 119 to Korean Patent Application Nos. 10-2020-0151331 filed on Nov. 12, 2020 and 10-2021-0149469, filed on Nov. 3, 2021, respectively, in the Korean Intellectual Property Office, the disclosures of which are incorporated by reference herein in their entireties.

BACKGROUND

Embodiments of the present disclosure described herein relate to an electronic device, and more particularly, relate to an electronic device effectively managing heat generation of a systolic array processor and an operating method of the electronic device.

Machine learning requires simple and iterative operations. A graphic processing unit (GPU) may be used for the simple and iterative operations. That is, because the GPU is a device designed to process graphics data (or information), not for machine learning, there is a limitation on performing computations/calculations associated with the machine learning.

Novel processors optimized for the machine learning are being developed to overcome the limitation of the GPU. A processor implemented to perform the machine learning in hardware may quickly perform an operation associated with the machine learning. In the processor implemented to perform the machine learning in hardware, however, because a lot of computing units perform a plurality of operations at the same time, a lot of power may be consumed, thereby causing a heat generation issue.

SUMMARY

Embodiments of the present disclosure provide an electronic device effectively managing heat generation of a systolic array processor and an operating method of the electronic device.

According to an embodiment, an electronic device includes a main processor, and a systolic array processor, and the systolic array processor includes processing elements, a kernel data memory that provides a kernel data set to the processing elements, a data memory that provides an input data set to the processing elements, and a controller that provides commands to the processing elements. The main processor translates source codes associated with the systolic array processor into commands of the systolic array processor, calculates a switching activity value based on the commands, and stores the translated commands and the switching activity value to a machine learning module, which is based on the systolic array processor.

As an example, the machine learning module includes a plurality of layers, and the main processor calculates the switching activity value for each of the plurality of layers.

As an example, when the machine learning module is executed by the systolic array processor, the main processor selects a frequency of a clock signal to be supplied to the systolic array processor based on the switching activity value.

As an example, the machine learning module includes a plurality of layers. When the machine learning module is executed by the systolic array processor, the main processor selects a frequency of a clock signal to be supplied to each of the plurality of layers of the systolic array processor based on the switching activity value.

As an example, when the machine learning module is executed, processing elements belonging to a first region from among the processing elements are activated, and processing elements belonging to the remaining region are deactivated, and the main processor calculates the switching activity value by differently reflecting a switching feature of the processing elements of the first region and a switching feature of the processing elements of the remaining region.

As an example, the remaining region includes a second region including processing elements sharing rows with the first region, a third region including processing elements sharing columns with the first region, and a fourth region including processing elements not sharing the rows and the columns with the first region, and the main processor calculates the switching activity value by differently reflecting a switching feature of the processing elements of the second region, a switching feature of the processing elements of the third region, and a switching feature of the processing elements of the fourth region.

As an example, the switching activity value indicates the number of times that switching of a signal occurs in a unit clock cycle.

According to an embodiment, an operating method of an electronic device which includes a main processor and a systolic array processor includes reading, at the main processor, a switching activity value of the systolic array processor, and selecting, at the main processor, a frequency of a clock signal to be supplied to the systolic array processor based on the switching activity value, and the switching activity value indicates the number of times that switching of a signal occurs in a unit clock cycle.

As an example, the switching activity value is included in a machine learning module executable by the systolic array processor as a fixed value.

As an example, the selecting of the frequency of the clock signal includes calculating a limit frequency of the systolic array processor based on the switching activity value, and selecting a frequency, which is lower than the limit frequency and is the highest, from among frequencies of the clock signal to be supplied to the systolic array processor.

As an example, a machine learning module executable by the systolic array processor includes a plurality of layers, the plurality of layers have different switching activity values, and the selecting of the frequency of the clock signal includes selecting a frequency of the clock signal associated with each of the plurality of layers, based on the different switching activity values.

As an example, the method further includes translating, at the main processor, source codes of a machine learning module executable by the systolic array processor into commands executable by the machine learning module, and calculating, at the main processor, the switching activity value based on the commands.

As an example, the machine learning module includes a plurality of layers, and the calculating of the switching activity value includes calculating the switching activity value for each of the plurality of layers.

As an example, when the machine learning module is executed, processing elements belonging to a first region from among processing elements of the systolic array processor are activated, and processing elements belonging to the remaining region are deactivated, and the calculating of the switching activity value includes calculating the switching activity value by differently reflecting a switching feature of the processing elements of the first region and a switching feature of the processing elements of the remaining region.

As an example, the remaining region includes a second region including processing elements sharing rows with the first region, a third region including processing elements sharing columns with the first region, and a fourth region including processing elements not sharing the rows and the columns with the first region. The calculating of the switching activity value by differently reflecting the switching feature of the processing elements of the first region and the switching feature of the processing elements of the remaining region includes calculating the switching activity value by differently reflecting a switching feature of the processing elements of the second region, a switching feature of the processing elements of the third region, and a switching feature of the processing elements of the fourth region.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the invention. Below, the term "and/or" is interpreted as including any one of items listed with regard to the term, or a combination of some or all of the listed items.

Figure 1:
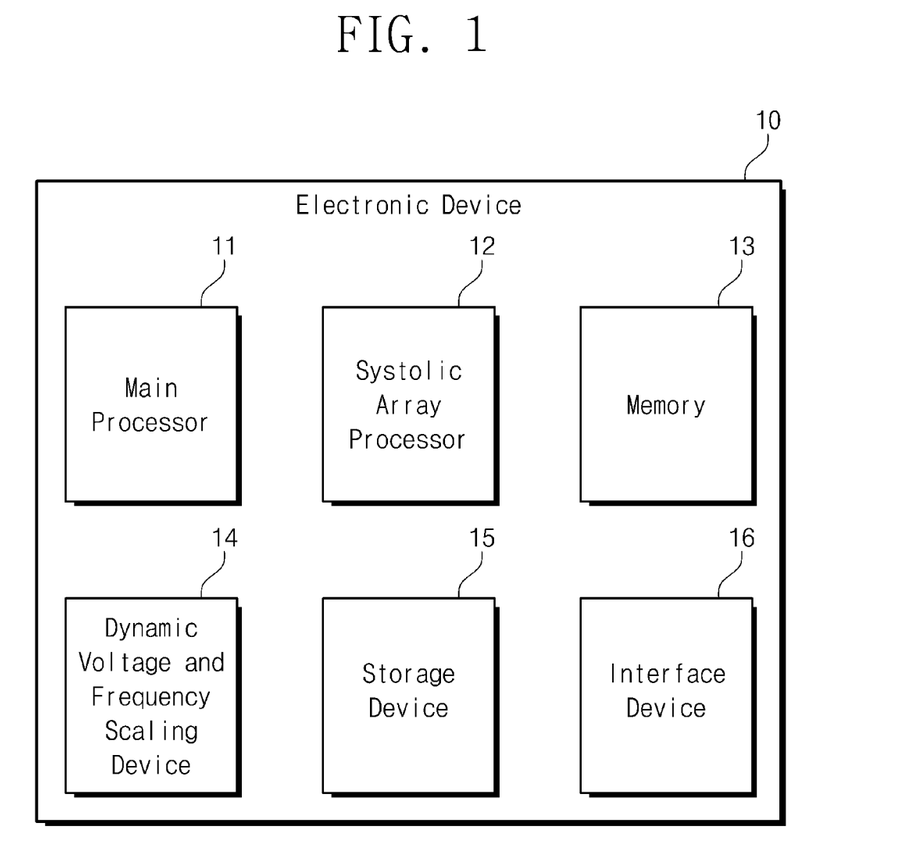
FIG. 1 illustrates an electronic device according to an embodiment of the present disclosure.

FIG. 1 illustrates an electronic device 10 according to an embodiment of the present disclosure. Referring to FIG. 1, the electronic device 10 may include a main processor 11, a systolic array processor 12, a memory 13, a dynamic voltage and frequency scaling device 14, a storage device 15, and an interface device 16.

The main processor 11 may include a central processing unit (CPU) or an application processor (AP). The main processor 11 may drive an operating system to control the electronic device 10. The main processor 11 may execute a plurality of applications. The main processor 11 may allow the systolic array processor 12 to execute a machine learning module. For example, the main processor 11 may load the machine learning module stored in the storage device 15 onto the systolic array processor 12.

The main processor 11 may load and execute the operating system and the applications from the storage device 15 to the memory 13. The main processor 11 may allow the dynamic voltage and frequency scaling device 14 to perform dynamic voltage and frequency scaling (DVFS). The main processor 11 may store the following installed on the electronic device 10 in the storage device 15: operating systems, applications, and/or source codes of modules. The main processor 11 may exchange information with an external other device or a user through the interface device 16.

The systolic array processor 12 may execute the machine learning module. The machine learning module may perform various operations such as inference and classification based on machine learning. The systolic array processor 12 may store result data generated by the machine learning module in the memory 13 or may provide the result data to the main processor 11.

The memory 13 may be used as a system memory of the electronic device 10. The memory 13 may include a dynamic random access memory (DRAM) or a storage class memory (SCM) including a nonvolatile memory.

Under control of the main processor 11, the dynamic voltage and frequency scaling device 14 may adjust a level of a voltage or a frequency of a clock signal, which is supplied to the main processor 11 and/or the systolic array processor 12.

The storage device 15 may store the following executable by the main processor 11 or the systolic array processor 12: original data of codes and/or commands of an operating system, applications, and/or modules. The storage device 15 may store user data generated by the main processor 11 or the systolic array processor 12. The storage device 15 may include various mass storage media such as a hard disk drive and a solid state drive.

The interface device 16 may include wired and/or wireless devices configured to communicate with an external device. The interface device 16 may include user output interface devices transferring information to the user and/or user input interfaces obtaining information from the user.

Figure 2:
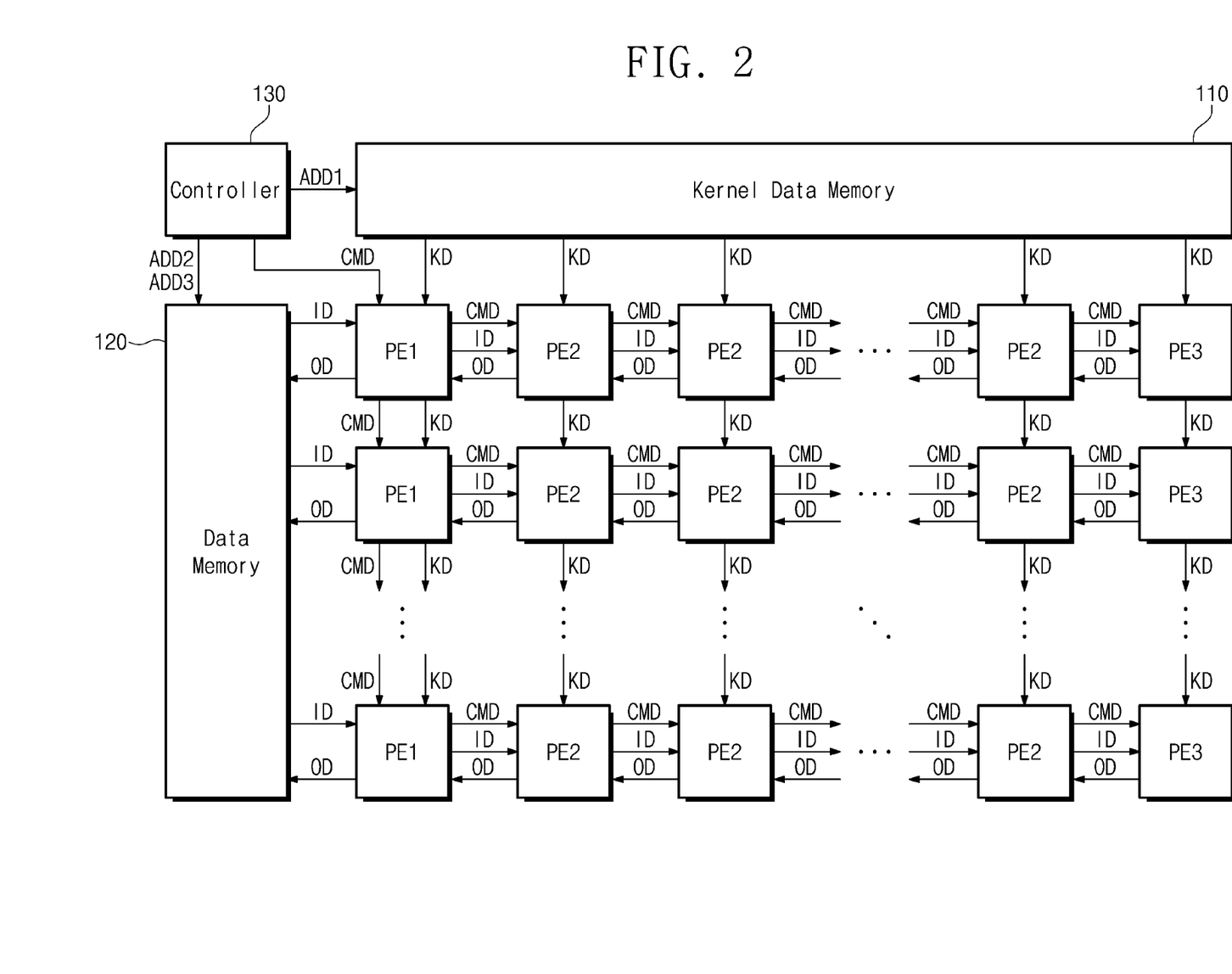
FIG. 2 illustrates a systolic array processor according to an embodiment of the present disclosure.

FIG. 2 illustrates a systolic array processor 100 according to an embodiment of the present disclosure. Referring to FIG. 2, the systolic array processor 100 may include a kernel data memory 110, a data memory 120, a controller 130, first processing elements PE1, second processing elements PE2, and third processing elements PE3.

The kernel data memory 110 may store kernel data (e.g., weight data) used as a kernel. In response to that a first address ADD1 is received from the controller 130, the kernel data memory 110 may provide kernel data KD to a first processing element PE1 belonging to a first row from among the first processing elements PE1, second processing elements PE2 belonging to the first row from among the second processing elements PE2, and a third processing element PE3 belonging to the first row from among the third processing elements PE3. For example, the kernel data memory 110 may provide kernel data of a storage space that the first address ADD1 indicates.

The data memory 120 may store input data and output data. In response to that a second address ADD2 is received from the controller 130, the data memory 120 may provide input data ID to the first processing elements PE1. For example, the data memory 120 may provide input data of a storage space that the second address ADD2 indicates. In response to that a third address ADD3 is received from the controller 130, the data memory 120 may store output data OD transferred from the first processing elements PE1. For example, the data memory 120 may store the output data OD in a storage space that the third address ADD3 indicates.

For example, the data memory 120 may provide the input data ID depending on an order of rows of the first processing elements PE1. The data memory 120 may provide the input data ID to the first processing element PE1 of the first row, and may provide the input data ID to the first processing element PE1 of the second row after one operation cycle (e.g., after one clock cycle of a clock signal passes).

The data memory 120 may provide the input data ID to the first processing element PE1 of the second row, and may provide the input data ID to the first processing element PE1 of the third row after one operation cycle passes. Likewise, the data memory 120 may provide the input data ID to the first processing element PE1 of an (m−1)-th row (m being a positive integer and indicating the number of rows of the processing elements PE1, PE2, and PE3), and may provide the input data ID to the first processing element PE1 of an m-th row after one operation cycle passes.

The controller 130 may provide the first address ADD1 to the kernel data memory 110. The controller 130 may provide the second address ADD2 and the third address ADD3 to the data memory 120. The controller 130 may provide a command CMD to the first processing element PE1 at the first row and first column.

The first processing elements PE1 may be disposed at the first column. The first processing element PE1 at the first row and first column may receive the command CMD from the controller 130, may receive the kernel data KD from the kernel data memory 110, and may receive the input data ID from the data memory 120. The first processing element PE1 at the first row and first column may generate the output data OD by performing an operation corresponding to the command CMD with respect to the kernel data KD and the input data ID.

The first processing element PE1 at the first row and first column may transfer the output data OD to the data memory 120. Also, the first processing element PE1 at the first row and first column may transfer the output data OD, which are transferred from the second processing element PE2 at the first row and second column, to the data memory 120. The first processing element PE1 at the first row and first column may transfer the command CMD and the kernel data KD to the first processing element PE1 of the second row.

Each of the first processing elements PE1 at the first column and the second to m-th rows may receive the command CMD and the kernel data KD from the first processing element PE1 of a previous row. Each of the first processing elements PE1 at the first column and the second to m-th rows may receive the input data ID from the data memory 120. Each of the first processing elements PE1 at the first column and the second to m-th rows may generate the output data OD by performing the operation corresponding to the command CMD with respect to the kernel data KD and the input data ID.

Each of the first processing elements PE1 at the first column and the second to m-th rows may transfer the output data OD to the data memory 120. Also, the first processing elements PE1 at the first column and the second to m-th rows may transfer the output data OD, which are respectively transferred from the second processing elements PE2 at the second column and the second to m-th rows, to the data memory 120. Each of the first processing elements PE1 at the first column and the second to m-th rows may transfer the command CMD and the kernel data KD to the first processing element PE1 of a next row.

Each of the second processing elements PE2 of the first row may receive the command CMD and the input data ID from a processing element PE1 or PE2 of a previous column. Each of the second processing elements PE2 of the first row may receive the kernel data KD from the kernel data memory 110.

Each of the second processing elements PE2 of the first row may generate the output data OD by performing the operation corresponding to the command CMD with respect to the kernel data KD and the input data ID. Each of the second processing elements PE2 of the first row may transfer the output data OD to a processing element PE1 or PE2 of a previous column.

Each of the second processing elements PE2 of the second row to the m-th row may receive the command CMD and the input data ID from a processing element PE1 or PE2 of a previous column. Each of the second processing elements PE2 of the second row to the m-th row may receive the kernel data KD from the second processing element PE2 of a previous row.

Each of the second processing elements PE2 of the second row to the m-th row may generate the output data OD by performing the operation corresponding to the command CMD with respect to the kernel data KD and the input data ID. Each of the second processing elements PE2 of the second row to the m-th row may transfer the output data OD to a processing element PE1 or PE2 of a previous column.

The third processing element PE3 of the first row may receive the command CMD and the input data ID from the second processing element PE2 of a previous column. The third processing element PE3 of the first row may receive the kernel data KD from the kernel data memory 110.

The third processing element PE3 of the first row may generate the output data OD by performing the operation corresponding to the command CMD with respect to the kernel data KD and the input data ID. The third processing element PE3 of the first row may transfer the output data OD to the second processing element PE2 of a previous column.

Each of the third processing elements PE3 of the second row to the m-th row may receive the command CMD and the input data ID from the second processing element PE2 of a previous column. Each of the third processing elements PE3 of the second row to the m-th row may receive the kernel data KD from the third processing element PE3 of a previous row.

Each of the third processing elements PE3 of the second row to the m-th row may generate the output data OD by performing the operation corresponding to the command CMD with respect to the kernel data KD and the input data ID. Each of the third processing elements PE3 of the second row to the m-th row may transfer the output data OD to the second processing element PE2 of a previous column.

Figure 3:
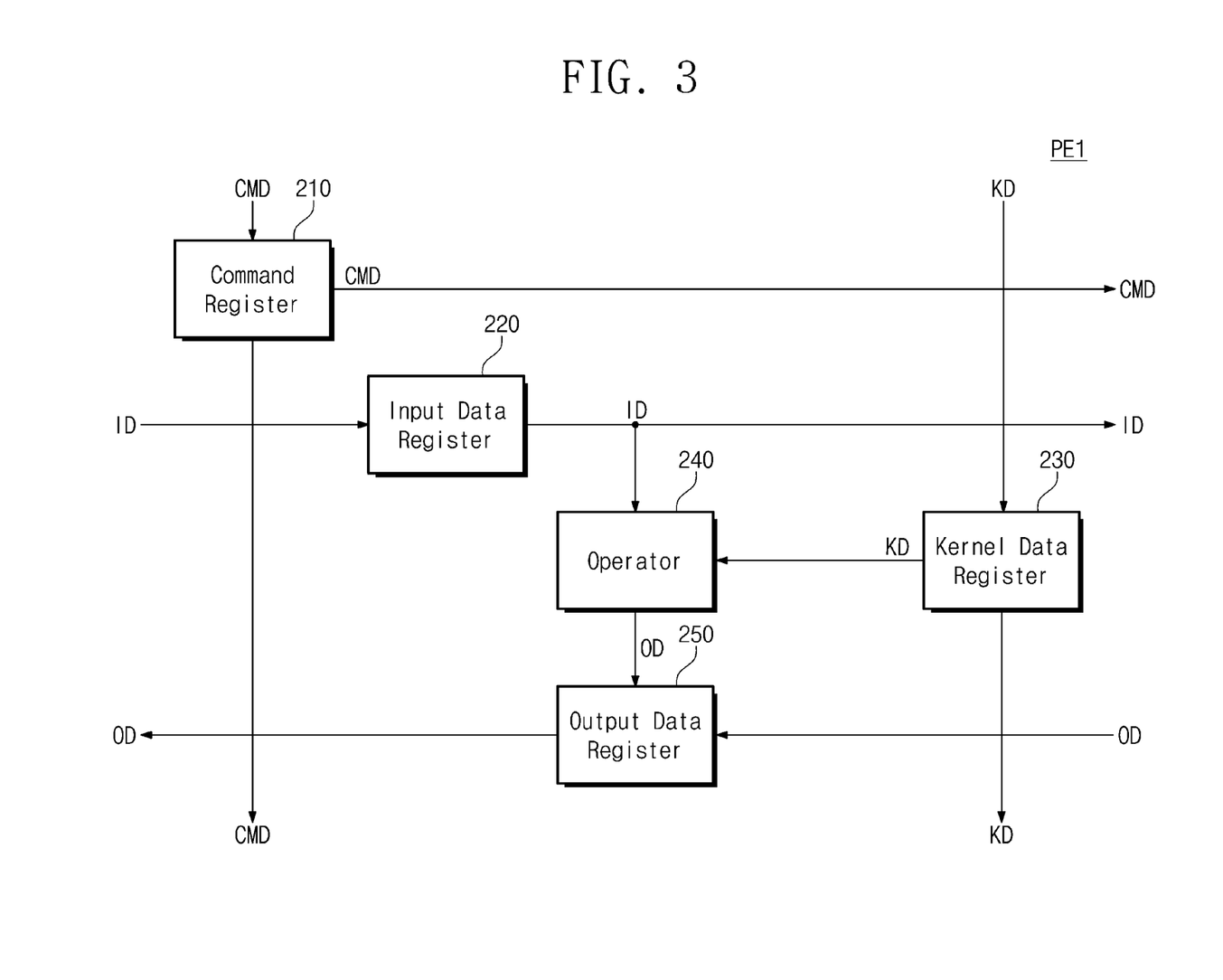
FIG. 3 illustrates a first processing element according to an embodiment of the present disclosure.

FIG. 3 illustrates the first processing element PE1 according to an embodiment of the present disclosure. Referring to FIGS. 2 and 3, the first processing element PE1 may include a command register 210, an input data register 220, a kernel data register 230, an operator 240, and an output data register 250.

The command register 210 may store the command CMD transferred from the controller 130 or from the first processing element PE1 of a previous row. The command register 210 may transfer the command CMD to the second processing element PE2 of a next column. In each of the first processing elements PE1 of the first row to the (m−1)-th row, the command register 210 may transfer the command CMD to the first processing element PE1 of a next row.

The input data register 220 may store the input data ID transferred from the data memory 120. The input data register 220 may transfer the stored input data ID to the operator 240 and to the second processing element PE2 of a next column.

The kernel data register 230 may store the kernel data KD transferred from the kernel data memory 110 or from the first processing element PE1 of a previous row. The kernel data register 230 may transfer the stored kernel data KD to the operator 240. In each of the first processing elements PE1 of the first row to the (m−1)-th row, the kernel data register 230 may transfer the stored kernel data KD to the first processing element PE1 of a next row.

The operator 240 may receive the input data ID from the input data register 220 and may receive the kernel data KD from the kernel data register 230. The operator 240 may generate the output data OD by performing an operation indicated by the command CMD with respect to the kernel data KD and the input data ID. The operator 240 may transfer the output data OD to the output data register 250.

The output data register 250 may store the output data OD transferred from the operator 240 or the output data OD transferred from the second processing element PE2 of a next column. The output data register 250 may transfer the stored output data OD to the data memory 120.

In the first processing element PE1 of the m-th row, a path through which the command CMD is transferred to a processing element of a next row may be omitted. The second processing elements PE2 and the third processing elements PE3 may be changed or modified such that the command CMD is received from a processing element PE1 or PE2 of a previous column. In the second processing elements PE2 and the third processing elements PE3, a path through which the command CMD is transferred to a processing element of a next row may be omitted. In the third processing elements PE3, a path through which the command CMD is transferred to any other processing element may be omitted.

Figure 4:
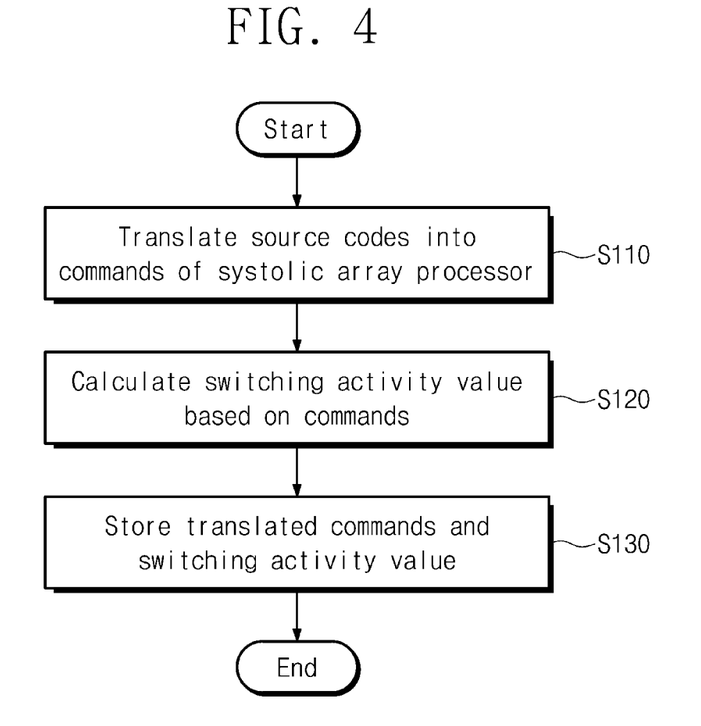
FIG. 4 illustrates an example of an operating method of an electronic device.

FIG. 4 illustrates an example of an operating method of the electronic device 10. Referring to FIGS. 1 and 4, the main processor 11 of the electronic device 10 may compile a machine learning module to be executed by the systolic array processor 12. For example, in operation S110, the main processor 11 may translate source codes of the machine learning module into commands executable by the systolic array processor 12.

When the translation into the commands is completed, in operation S120, the main processor 11 may calculate a switching activity value of the machine learning module based on the translated commands. For example, the main processor 11 may calculate the average number of times that a level of a signal per unit cycle of a clock signal is changed (e.g., inverted) at the systolic array processor 12 when the systolic array processor 12 executes commands, as a switching activity value. For example, the main processor 11 may calculate the switching activity value based on simulation. Alternatively, the main processor 11 may calculate the switching activity value based on a function or may obtain the switching activity value from a lookup table.

In operation S130, the main processor 11 may store the translated commands and the switching activity value to the compiled machine learning module for the systolic array processor 12.

In an embodiment, the machine learning module may include a plurality of layers. The systolic array processor 12 may execute the machine learning module by sequentially executing the plurality of layers. The main processor 11 may calculate the switching activity value for each of the plurality of layers.

Figure 5:
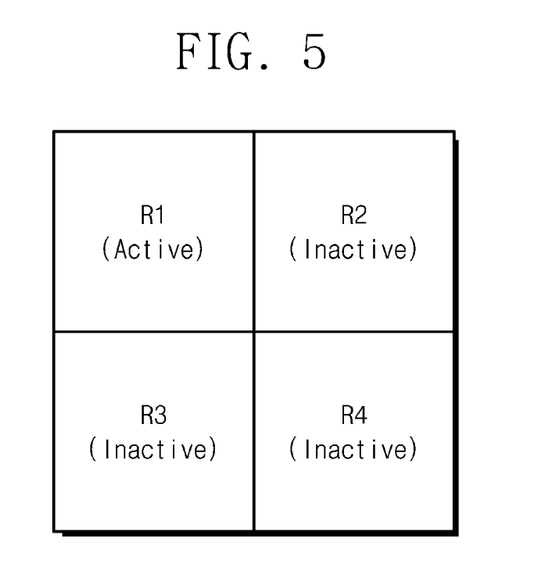
FIG. 5 illustrates an example in which processing elements of a systolic array processor operate when executing a machine learning module.

FIG. 5 illustrates an example in which processing elements of the systolic array processor 12 operate when executing a machine learning module. Referring to FIGS. 2 and 5, processing elements of a first region R1 may be activated. The processing elements of the first region R1 may receive valid kernel data KD from the kernel data memory 110 or other processing elements, may receive valid input data ID from the data memory 120 or other processing elements, and may receive a valid command CMD from the controller 130 or other processing elements.

Processing elements of the remaining regions, for example, a second region R2, a third region R3, and a fourth region R4 may be deactivated. The processing elements PE2 and PE3 of the second region R2 may share rows with the processing elements PE1 and PE2 of the first region R1 activated. The processing elements PE2 and PE3 of the second region R2 may receive invalid kernel data KD (e.g., values fixed to "0" or "1") from the kernel data memory 110 and may transfer the invalid kernel data KD to the processing elements PE2 and PE3 of a next row.

The processing elements PE2 and PE3 of the second region R2 may receive the valid input data ID (e.g., values switching between "0" and "1") and the valid command CMD from the processing elements PE1 and PE2 of the first region R1. The processing elements PE2 and PE3 of the second region R2 may perform an operation corresponding to the valid command CMD with respect to the valid input data ID and the invalid kernel data KD. The processing elements PE2 and PE3 of the second region R2 may transfer the valid input data ID and the valid command CMD to the processing elements PE2 and PE3 of a next column.

The processing elements PE1 and PE2 of the third region R3 may share columns with the processing elements PE1 and PE2 of the first region R1 activated. The processing elements PE1 and PE2 of the third region R3 may receive the valid kernel data KD (e.g., values switching between "0" and "1") from the processing elements PE1 and PE2 of the first region R1 and may transfer the valid kernel data KD to the processing elements PE1 and PE2 of a next row.

The processing elements PE1 and PE2 of the third region R3 may receive invalid input data ID from the data memory 120. The processing elements PE1 and PE2 of the third region R3 may receive the valid command CMD from the first processing elements PE1 of the first region R1. The processing elements PE1 and PE2 of the third region R3 may perform the operation corresponding to the valid command CMD with respect to the invalid input data ID and the valid kernel data KD. The processing elements PE1 and PE2 of the third region R3 may transfer the invalid input data ID and/or the valid command CMD to the processing elements PE1 and PE2 of a next column.

The processing elements PE2 and PE3 of the fourth region R4 may not share rows and columns with the processing elements PE1 and PE2 of the first region R1 activated. The processing elements PE2 and PE3 of the fourth region R4 may receive the invalid kernel data KD from the processing elements PE2 and PE3 of the second region R2 and may transfer the invalid kernel data KD to the processing elements PE2 and PE3 of a next row.

The processing elements PE2 and PE3 of the fourth region R4 may receive the invalid input data ID from the processing elements PE1 and PE2 of the third region R3. The processing elements PE2 and PE3 of the fourth region R4 may receive the valid command CMD from the processing elements PE1 and PE2 of the third region R3. The processing elements PE2 and PE3 of the fourth region R4 may perform the operation corresponding to the valid command CMD with respect to the invalid input data ID and the invalid kernel data KD. The processing elements PE2 and PE3 of the fourth region R4 may transfer the invalid input data ID and the valid command CMD to the processing elements PE2 and PE3 of a next column.

As described above, operation features of the processing elements PE1 and PE2 of the first region R1, operation features of the processing elements PE2 and PE3 of the second region R2, operation features of the processing elements PE1 and PE2 of the third region R3, and operation features of the processing elements PE2 and PE3 of the fourth region R4 may be different from each other.

The electronic device 10 according to an embodiment of the present disclosure may differently reflect a switching feature of the processing elements PE1 and PE2 of the first region R1, a switching feature of the processing elements PE2 and PE3 of the second region R2, a switching feature of the processing elements PE1 and PE2 of the third region R3, and a switching feature of the processing elements PE2 and PE3 of the fourth region R4. For example, the electronic device 10 may calculate a switching activity value based on Equation 1 below.

$$\alpha = \frac{\left(\sum_{1}^{R*C} S1 + \sum_{1}^{R*(128-C)} S2 + \sum_{1}^{(128-R)*C} S3 + \sum_{1}^{(128-R)*(128-C)} S4\right)}{L}$$ [Equation 1]

In Equation 1, "α" may be a switching activity value, "R" may be the number of rows of processing elements PE1 and PE2 of the first region R1 activated, "C" may be the number of columns of processing elements PE1 and PE2 of the first region R1 activated, and "L" may be the total number of clock cycles in which commands are performed at the systolic array processor 12.

S1, S2, S3, and S4 may respectively be the switching feature of the first region R1, the switching feature of the second region R2, the switching feature of the third region R3, and the switching feature of the fourth region R4. A switching feature of each region may be defined by Equation 2 below.

$$S = \Sigma W_k * X_k$$ [Equation 2]

"$W_k$" may indicate a frequency at which switching occurs in a k-th arithmetic operation and may be a value normalized to a value between "0" and "1". "k" may indicate an index of calculations executable by a processing element of the systolic array processor 12. "$X_k$" may indicate the number of times that a k-th arithmetic operation is performed.

In an embodiment, "$W_k$" may be measured by the main processor 11 while the systolic array processor 12 executes commands. For another example, "$W_k$" may be calculated by the main processor 11 based on simulation. Alternatively, "$W_k$" may be calculated by the main processor 11 based on a function or may be obtained from a lookup table.

Figure 6:
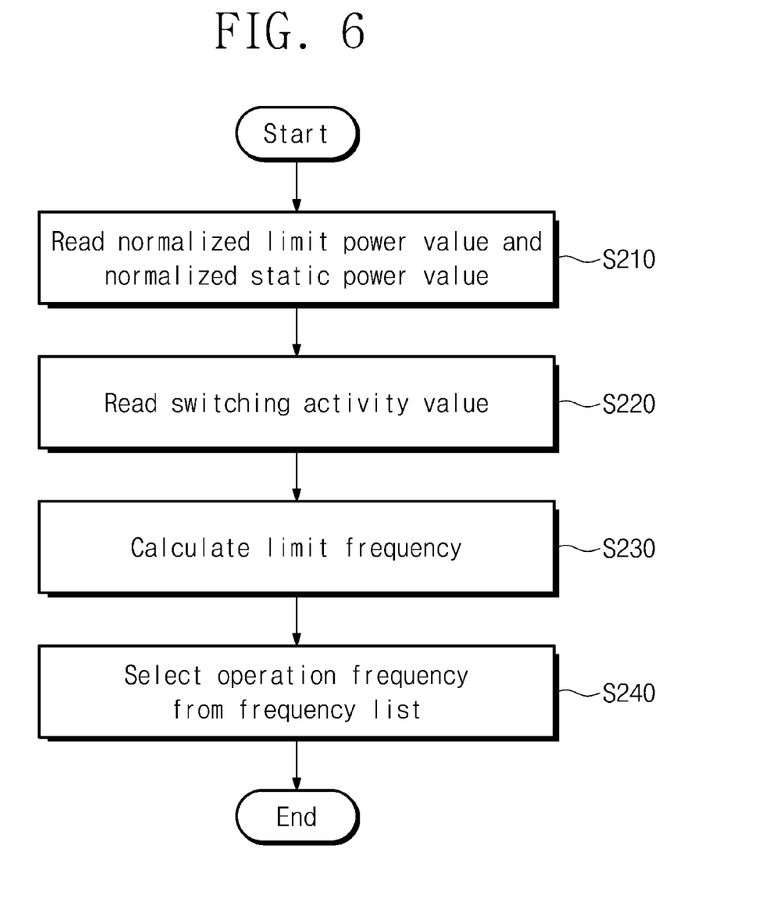
FIG. 6 illustrates an example in which an electronic device selects a frequency of a clock signal of a systolic array processor based on a switching activity value.

FIG. 6 illustrates an example in which the electronic device 10 selects a frequency of a clock signal of the systolic array processor 12 based on a switching activity value. Referring to FIGS. 1 and 6, in operation S210, the main processor 11 of the electronic device 10 may read a normalized limit power value and a normalized static power value of the systolic array processor 12. For example, the normalized limit power value and the normalized static power value may be included in the compiled machine learning module. The normalized limit power value and the normalized static power value may be relative values.

The normalized limit power value may be determined such that a temperature of the systolic array processor 12 does not exceed a limit temperature. The limit temperature may be a temperature at which the systolic array processor 12 operates abnormally and may be determined depending on a physical feature of the systolic array processor 12.

In operation S220, the main processor 11 of the electronic device 10 may read a switching activity value of the systolic array processor 12. For example, the switching activity value may be included in the compiled machine learning module.

In operation S230, the main processor 11 may calculate a limit frequency. The limit frequency may be a frequency at which power consumption of the systolic array processor 12 does not exceed the normalized limit power value.

Below, the process in which the main processor 11 of the electronic device 10 calculates a limit frequency will be described the following equations. Power consumption of the systolic array processor 12 may be calculated by Equation 3 below.

$$P_{total} = P_{static} + P_{dynamic}$$ [Equation 3]

In Equation 3, $P_{total}$ may be total power consumption (e.g., a normalized value) of the systolic array processor 12, $P_{static}$ may be static power consumption (e.g., a normalized value) of the systolic array processor 12, and $P_{dynamic}$ may be dynamic power consumption (e.g., a normalized value) of the systolic array processor 12. When the total power consumption $P_{total}$ is controlled to be smaller than the limit power value, heat generation of the systolic array processor 12 may be effectively managed.

The static power consumption $P_{static}$ may be calculated by Equation 4 below.

$$P_{static} = V\left(c1 T^2 e^{\frac{c2}{T}} + I_{gate}\right)$$ [Equation 4]

In Equation 4, "V" may be a voltage, "T" may be a temperature, C1 and C2 may be hardware-based constants, $I_{gate}$ may be a gate leakage current. As expressed by Equation 4, the static power consumption $P_{static}$ does not depend on a frequency. Accordingly, in the process of calculating the frequency, the static power consumption $P_{static}$ may be considered as a constant.

The dynamic power consumption $P_{dynamic}$ may be calculated by Equation 5 below.

$$P_{dynamic} = P_{clock\_switching} + P_{logic\_switching} = (\alpha + \beta) * F$$ [Equation 5]

$P_{clock\_switching}$ may be power consumption due to switching of a clock signal that is supplied to the processing elements PE1, PE2, and PE3. β may indicate switching activity (e.g., a normalized value) of a clock signal. Because the clock signal toggles every clock cycle, the switching activity β of the clock signal may be "1" being a maximum value. $P_{logic\_switching}$ may be power consumption due to switching of data bits in the processing elements PE1, PE2, and PE3. α may be switching activity calculated based on Equation 1. "F" may be a frequency of a clock signal that is supplied to the systolic array processor 12.

Equation 3 may be rearranged as Equation 6, based on Equation 4 and Equation 5.

$$P_{static} + P_{dynamic} = \gamma + (\alpha + \beta) F$$ [Equation 6]

γ may be a value of expressing the static power consumption $P_{static}$ with a constant. When a value of Equation 6 is managed to be smaller than the limit power value, heat generation of the systolic array processor 12 may be effectively managed. The frequency "F" may be determined from Equation 6, based on Equation 7.

$$F < (M-\gamma)/(\alpha+\beta) \qquad \text{[Equation 7]}$$

The limit power value "M", the static power value γ, and the switching activity value α may be determined or measured in advance and may be included in the compiled machine learning module. Accordingly, the main processor 11 may calculate the limit frequency.

The dynamic voltage and frequency scaling device 14 may supply the systolic array processor 12 with clock signals of different frequencies, the number of which is determined in advance. The main processor 11 may read a list of the frequencies from the dynamic voltage and frequency scaling device 14. In operation S240, the main processor 11 may select an operation frequency from the frequency list. For example, the main processor 11 may select a frequency, which is lower than the limit frequency "F" and is the highest, from among the frequencies of the list as the operation frequency.

Figure 7:
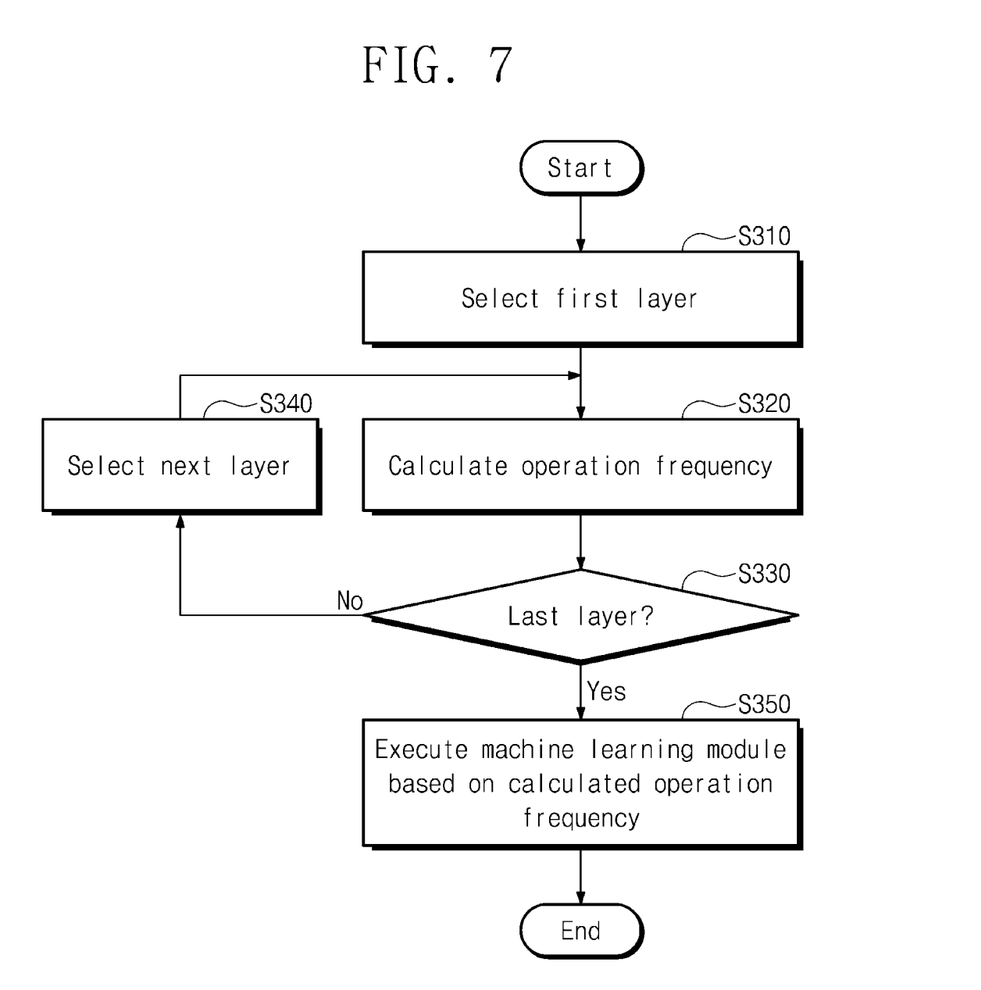
FIG. 7 illustrates an example in which an electronic device determines operation frequencies of a plurality of layers of a machine learning module.

FIG. 7 illustrates an example in which the electronic device 10 determines operation frequencies of a plurality of layers of a machine learning module. Referring to FIGS. 1 and 7, in operation S310, the main processor 11 of the electronic device 10 may select a first layer from the plurality of layers of the machine learning module.

In operation S320, the main processor 11 may calculate an operation frequency of the systolic array processor 12, which corresponds to the selected layer. For example, the main processor 11 may calculate the operation frequency of the selected layer, depending on the method described with reference to FIG. 6.

In operation S330, the main processor 11 may determine whether the selected layer is the last layer of the machine learning module. When the selected layer is not the last layer of the machine learning module, in operation S340, the main processor 11 may select a next layer of the plurality of layers of the machine learning module. Afterwards, the main processor 11 may again perform operation S320. When the selected layer is the last layer of the machine learning module, in operation S350, the main processor 11 may control the systolic array processor 12 such that the machine learning module is executed based on the selected operation frequencies.

The systolic array processor 12 may perform parallel processing by using a plurality of processing elements during a short time. For example, the electronic device 10 may be implemented to sense a temperature of the systolic array processor 12 and to control a frequency of a clock signal to be supplied to the systolic array processor 12 based on the temperature. However, when the parallel processing is intensively performed during a short time, a temperature of the systolic array processor 12 may exceed the limit temperature before controlling a frequency.

The electronic device 10 according to an embodiment of the present disclosure manages heat generation of the systolic array processor 12 in advance based on switching activity, not managing heat generation of the systolic array processor 12 after the fact. Accordingly, heat generation of the systolic array processor 12 may be effectively managed.

According to the present disclosure, an electronic device selects a frequency of a clock signal to be supplied to a systolic array processor based on a switching activity value calculated in advance. Because heat generation of the systolic array processor is managed in advance, not after the fact, an electronic device managing heat generation of the systolic array processor more effectively and an operating method of the electronic device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a main processor; and
a systolic array processor,
wherein the systolic array processor includes:
processing elements;
a kernel data memory configured to provide a kernel data set to the processing elements;
a data memory configured to provide an input data set to the processing elements; and
a controller configured to provide commands to the processing elements,
wherein the main processor is configured to:
translate source codes associated with the systolic array processor into commands of the systolic array processor;
calculate a switching activity value based on the commands; and
store the translated commands and the switching activity value to a machine learning module, which is based on the systolic array processor,
wherein the switching activity value indicates the number of times that switching of a signal occurs in a unit clock cycle.

2. The electronic device of claim 1, wherein the machine learning module includes a plurality of layers, and
wherein the main processor calculates the switching activity value for each of the plurality of layers.

3. The electronic device of claim 1, wherein, when the machine learning module is executed by the systolic array processor, the main processor selects a frequency of a clock signal to be supplied to the systolic array processor based on the switching activity value.

4. The electronic device of claim 1, wherein the machine learning module includes a plurality of layers, and
wherein, when the machine learning module is executed by the systolic array processor, the main processor selects a frequency of a clock signal to be supplied to each of the plurality of layers of the systolic array processor based on the switching activity value.

5. The electronic device of claim 1, wherein, when the machine learning module is executed, processing elements belonging to a first region from among the processing elements are activated, and processing elements belonging to the remaining region are deactivated, and
wherein the main processor calculates the switching activity value by differently reflecting a switching feature of the processing elements of the first region and a switching feature of the processing elements of the remaining region.

6. The electronic device of claim 5, wherein the remaining region includes a second region including processing elements sharing rows with the first region, a third region including processing elements sharing columns with the first region, and a fourth region including processing elements not sharing the rows and the columns with the first region, and wherein the main processor calculates the switching activity value by differently reflecting a switching feature of the processing elements of the second region, a switching feature of the processing elements of the third region, and a switching feature of the processing elements of the fourth region.

7. An operating method of an electronic device which includes a main processor and a systolic array processor, the method comprising:

reading, at the main processor, a switching activity value of the systolic array processor; and selecting, at the main processor, a frequency of a clock signal to be supplied to the systolic array processor based on the switching activity value, wherein the switching activity value indicates the number of times that switching of a signal occurs in a unit clock cycle.

8. The method of claim 7, wherein the switching activity value is included in a machine learning module executable by the systolic array processor as a fixed value.

9. The method of claim 7, wherein the selecting of the frequency of the clock signal includes:

calculating a limit frequency of the systolic array processor based on the switching activity value; and selecting a frequency, which is lower than the limit frequency and is the highest, from among frequencies of the clock signal to be supplied to the systolic array processor.

10. The method of claim 7, wherein a machine learning module executable by the systolic array processor includes a plurality of layers, and wherein the plurality of layers have different switching activity values, and wherein the selecting of the frequency of the clock signal includes:

selecting a frequency of the clock signal associated with each of the plurality of layers, based on the different switching activity values.

11. The method of claim 7, further comprising:

translating, at the main processor, source codes of a machine learning module executable by the systolic array processor into commands executable by the machine learning module; and calculating, at the main processor, the switching activity value based on the commands.

12. The method of claim 11, wherein the machine learning module includes a plurality of layers, and wherein the calculating of the switching activity value includes:

calculating the switching activity value for each of the plurality of layers.

13. The method of claim 11, wherein, when the machine learning module is executed, processing elements belonging to a first region from among processing elements of the systolic array processor are activated, and processing elements belonging to the remaining region are deactivated, and wherein the calculating of the switching activity value includes:

calculating the switching activity value by differently reflecting a switching feature of the processing elements of the first region and a switching feature of the processing elements of the remaining region.

14. The method of claim 13, wherein the remaining region includes a second region including processing elements sharing rows with the first region, a third region including processing elements sharing columns with the first region, and a fourth region including processing elements not sharing the rows and the columns with the first region, wherein the calculating of the switching activity value by differently reflecting the switching feature of the processing elements of the first region and the switching feature of the processing elements of the remaining region includes:

calculating the switching activity value by differently reflecting a switching feature of the processing elements of the second region, a switching feature of the processing elements of the third region, and a switching feature of the processing elements of the fourth region.

* * * * *